Nov. 12, 1929.　　　T. C. MOORE　　　1,735,406
FRUIT PERFORATING MACHINE
Filed Nov. 1, 1926　　　2 Sheets-Sheet 1
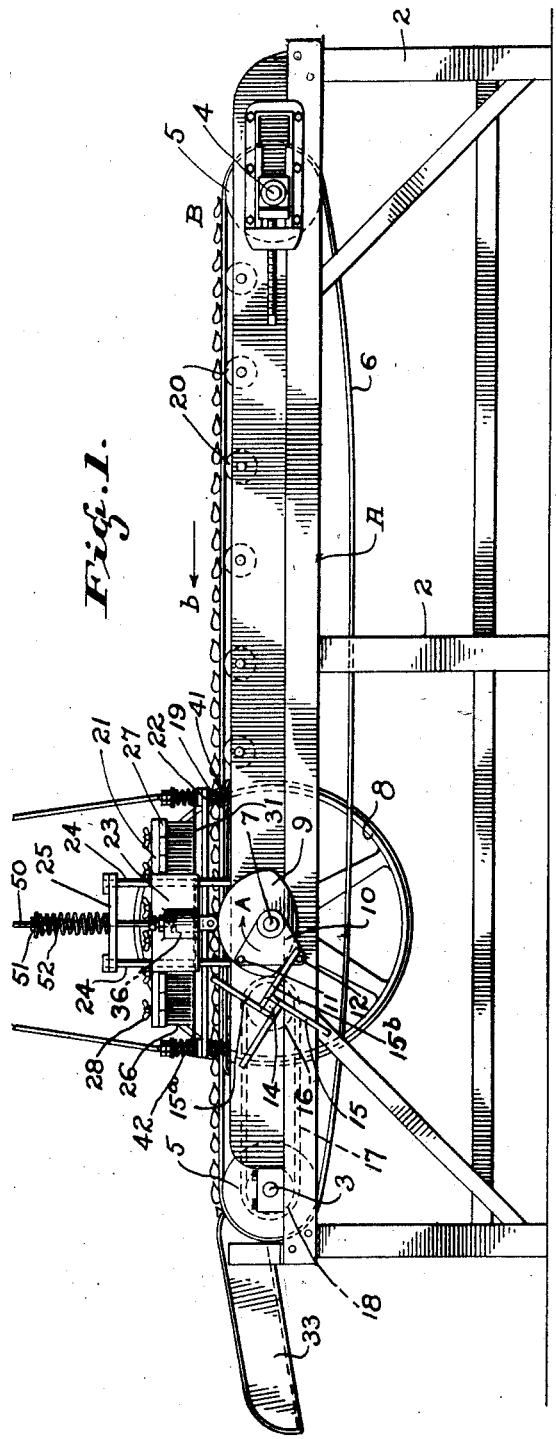
INVENTOR.
Thomas C. Moore.
BY
Townsend, Loftus & Affett
ATTORNEYS.

Nov. 12, 1929.     T. C. MOORE     1,735,406
FRUIT PERFORATING MACHINE
Filed Nov. 1, 1926     2 Sheets-Sheet 2
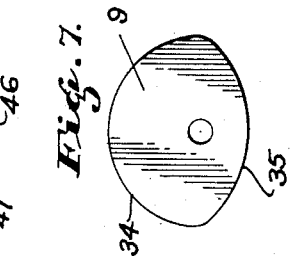
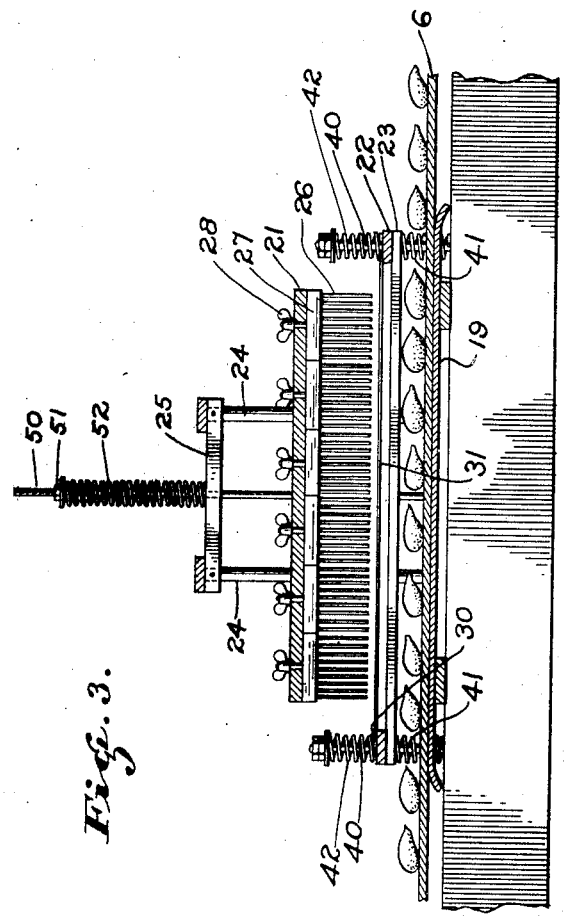
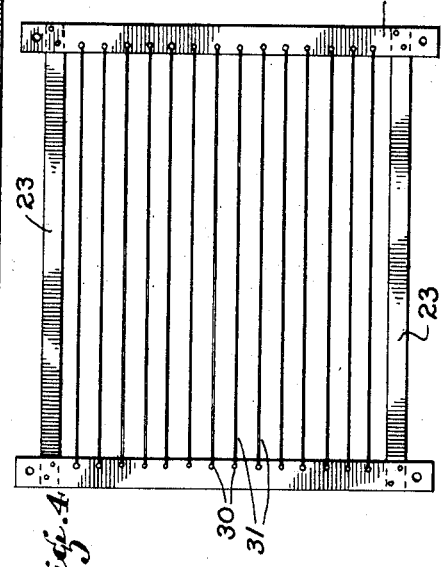
INVENTOR.
Thomas C. Moore.
BY
Townsend, Loftus & Abbett
ATTORNEYS.

Patented Nov. 12, 1929

1,735,406

UNITED STATES PATENT OFFICE

THOMAS C. MOORE, OF FRESNO, CALIFORNIA, ASSIGNOR TO MOR-PAK PRESERVING CORPORATION, OF FRESNO, CALIFORNIA, A CORPORATION OF NEVADA

FRUIT-PERFORATING MACHINE

Application filed November 1, 1926. Serial No. 145,677.

This invention relates to a perforating machine and particularly to a type of machine adapted for perforating fruits such as figs and the like.

In preparing fruits, particularly figs and the like, for preserving, I have found that by perforating the same with a large number of minute perforations, much less time is required in cooking; bursting or splitting is avoided as internal pressure caused by steam is released through the perforations, the keeping quality of the fruit is increased by a more uniform permeation by the syrup solution and shrinkage is also prevented, due to better permeation. When completed and packed the fruit is whole and retains its natural color and plumpness, as the cooking period is materially reduced and the syrup solution is absorbed by the fruit through the perforations, when cooling, thus plumping the fruit.

The object of the present invention is to provide a machine by means of which figs and the like can be readily perforated without in any way injuring or marring the same; to provide a machine of large capacity and further to provide a machine which automatically feeds the fruit and discharges the fruit.

One form which the invention may assume is shown by way of illustration in the accompanying drawings, in which:

Figure 1 is a side elevation of the machine,
Figure 2 is a plan view of the machine,
Figure 3 is an enlarged longitudinal section of the feed belt in the perforating mechanism taken on the line III—III of Figure 2,
Figure 4 is a plan view of the stripping frame,
Figure 5 is an enlarge detail cross section of the roller adjusting mechanism whereby the perforating table is raised and lowered,
Figure 6 is an enlarged cross section of one of the perforating needles.
Fig. 7 is an enlarged side elevation of cam 9.

Referring to the drawings, in detail, and particularly Figures 1 and 2, A indicates a main frame supported by legs or standards 2. Extending crosswise of the frame and journaled thereon are a pair of cross shafts 3 and 4. These shafts are disposed at opposite ends of the frame and each carries pulleys 5 which, in turn, support an endless conveyor belt 6 which is preferably constructed of rubber or the like.

Extending crosswise of the frame and journaled at the point 7 is a drive shaft upon which is mounted a driving pulley 8, a pair of cam members 9 and a Geneva movement actuator 10. This actuator is in the form of a segment and it carries 2 pins 11 and 12, the function of which will hereinafter be described. Disposed forwardly of the driving shaft 7 and also journaled crosswise of the frame as at 13, is an intermediate driving shaft on one end of which is secured a hub member 14 from which radiates four arms such as indicated at 15. On the opposite end of the shaft is a sprocket gear 16, from which power is transmitted through a chain 17 to intermittently rotate a sprocket 18 secured on the shaft 3. The hub member 14 together with the radial arms 15 form the second member of the Geneva drive and its operates as follows:

The drive shaft 7 rotates in the direction of the arrow $a$ and as the segment 10 is secured to the shaft, it will rotate in the same direction. During rotation of the segment, pin 11 engages the arm $15^a$ and thereby rotates the hub member and shaft 13 a quarter of a revolution. At the same time that the pin 11 travels out of engagement with the arm $15^a$, the pin 12 engages the arm $15^b$ and rotation of the shaft 13 is continued for another quarter revolution. Thus during a one-half revolution of the shaft 7, a one-half revolution is also imparted to the shaft 13 and during the remaining one-half revolution of the shaft 7 no movement is imparted to the shaft 13 as the pins 11 and 12 will not engage the arms 15. The one-half revolution transmitted to the shaft 13 is transmitted through the socket chain 17 to the shaft 3. This, in turn, rotates the pulley 5 and, accordingly, advances the main conveyor belt 6, a predetermined distance in the direction of the arrow $b$.

Disposed below the belt 6 is a supporting plate 19 and similarly disposed below the belt forward of the supporting plate are a plurality of supporting rollers 20. Disposed above the plate 19 and the belt 6 is a perforating table 21 and disposed intermediate the perforating table and the belt is a stripping frame 22. Formed on each side of the table 21 are outwardly projecting lugs 23 and extending therethrough are guide rods 24. These rods are arranged in pairs on opposite sides of the main frame A and are secured thereto. The rods extend through the lugs 23 and thereby form guides which permit vertical movement of the perforating table, as will hereinafter be described. The upper ends of the rods are connected by a stationary frame 25, thus rigidly connecting the upper ends of the rods and forming a rigid support to guide the table 21 in its vertical movement.

The table 21 is best illustrated in Figure 3 and is referred to as a perforating table for the simple reason that it carries a plurality of perforating needles, such as indicated at 26. The needles are cast or otherwise secured in babbitt blocks such as indicated at 27 and these are, in turn, secured to the table proper by means of bolts and nuts as indicated at 28. This method of securing the needles is preferable as it sometimes happens that certain of the needles have become bent by rocks which have become embedded in the fruit or by metallic tools or the like which may accidentally have dropped on the belt. If one or more needles become bent in this manner, it is only necessary to release the block containing the bent needles and the block may thus be readily removed and a new block inserted.

The figs or other fruit to be perforated are placed on the conveyor belt 6 at the end indicated at B and uniformly spread in a single layer on the surface of the belt. The belt is intermittently advanced through the Geneva movement previously described and the figs are thus brought under the perforating table 21 while this table assumes a raised position. When the belt comes to rest during the inactive part of the Geneva drive downward movement is transmitted to the perforating table and the needles which are closely arranged perforates the figs and passes completely through the same. The perforating table is then elevated and the figs will also be elevated due to the numerous needles passing through each fig.

A stripping arrangement is, accordingly, required. This stripping arrangement consists of a rectangular-shaped frame consisting of cross bars 22 and longitudinal bars 23. Small pins are secured to the cross bars as indicated at 30 and wires 31 are strung longitudinally from pin to pin. The needles 26 pass between the wires 31 and are thus free to move downwardly when perforating the fruit. On the other hand when the perforating table is elevated the figs are retained by the longitudinal wires 31 and the needles are thus extracted and the moment they are extracted the figs drop back on the belt. After the figs are perforated, the Geneva movement again comes into action and the belt is advanced a sufficient distance to remove the perforated figs forwardly on the perforating table and, at the same time, delivering a new batch of figs into position to be perforated, during the next reciprocal movement of the perforating table.

The perforated figs are discharged from the belt 6 when passing over the pulley 5 and are thus delivered into a discharge chute 33. By referring to Figure 7, it will be noted that the cam 9 is provided with two surfaces, a surface of continuous radius such as indicated at 34 and a surface of diminishing radius such as indicated at 35. The surface of constant radius forms one half of the cam and the surface of diminishing radius forms the other half of the cam.

By referring to Figure 5, it will be noted that the lug 23 carries a plunger 36 which may be adjusted vertically by means of a set screw 37 and further that the lower end of the plunger carries a roller 38 which is engaged by the cam 9. It should also be understood that there are two cams such as indicated at 9, one on each end of the shaft and similarly that there are two adjustable rollers 38 one on each side of the perforating table. The table, together with the needles secured thereto is, in other words, supported by the cams 9 and the adjustable rollers 38 and the vertical movement imparted to the table is, accordingly, transmitted through the cams 9. The table assumes an elevated position when the rollers 38 engage the constant radius surface 34 of the cams and the table is raised and lowered when the rollers 38 engage the surface 35 of the diminishing radius.

It should also be noted by referring to Figure 1, that the segment 10 carrying the pins 11 and 12 aligns with the cam surface 34. This is important as it will cause advancing of the belt 6, while the perforating table is elevated and will permit the conveyor belt to remain stationary when the perforating table is being reciprocated. By again referring to Figures 1 and 4, it will be noted that the perforating frame is resiliently supported, that is, the ends of the cross bars 22 are perforated and are slidable and guided on the stationary rods 40 secured in pairs on opposite sides of the main frame A.

Springs, such as indicated at 41 are interposed between the main frame A and the lower portion of the stripping frame and springs 42 are interposed between the upper ends of the rods and the upper portion of the stripping frame. The stripping frame is, accordingly, resiliently supported and can yield both during downward movement of the perforating table and during the upward or stripping action. Another feature which should be considered is the cross-sectional shape of the perforating needles. This is indicated in Figure 6. This figure is an extreme enlargement of a cross section of a needle and it shows that the sides of the needles are parallel, as indicated at 45 and 46 and that the ends are slightly rounded as at 47.

Actual experience has shown that if the needle is round, it requires more force to perforate the fruit and it also requires additional force to strip the fruit. On the other hand, by making the needles of a cross-sectional area such as shown in Figure 6, both perforation and stripping is accomplished with much greater ease, thus relieving the cams 9 and rollers 38 of excessive stress and wear. The perforating table 21 is fairly heavy, due to the fact that the needles are cast in babbitt blocks as shown at 27 and secured to the lower face of the table. To relieve this weight a pair of rods are secured to the upper surface of the table at 50.

These rods are secured at opposite sides of the table and extend upwardly through the stationary frame 25. Adjustable nuts are placed on the upper ends of the rods as at 51 and springs 52 are interposed between the nuts and the frame 25. These springs are under compression and the compression may be increased or decreased by adjusting the position of the nuts 51. In other words, the springs 52 serve the function of counterbalancing, to some extent, the weight of the perforating table 21, thus further relieving the rollers 38 and the cams 9 of excessive wear. It will, of course, be understood that the tension of the springs must not be sufficient to hold the table in an elevated position, as such a tension would prevent downward movement of the table when perforating. The tension, in other words, merely relieves excess weight.

A machine constructed as described, permits fruits such as figs and the like to be handled in great quantities and it insures that each piece of fruit is completely perforated with a great number of perforations. It also prevents marring or mutilation of the fruit, as the movement of the perforating mechanism is vertical. It will, of course, be understood that the belt 6 will be kept covered with figs or other fruit to be handled by workers stationed at the end B. This will be the only attention required as the machine is, otherwise entirely automatic in operation, that is, the figs are advanced from the point where they are delivered and they are then automatically perforated, stripped and discharged from the machine.

Having thus described my invention, what I claim and desire to secure by Letters-Patent is:—

1. In a perforating machine of the character described, a perforating table, means for imparting vertical reciprocal movement thereto, and a plurality of needles carried by the table, said needles being substantially rectangular-shaped in cross-section.

2. In a perforating machine of the character described, a perforating table, a plurality of perforating needles carried by the table, means for imparting an intermittent vertical reciprocal movement to the table and the needles, said table being supported by said last named means, and a pair of springs connected with the table and forming a partial support for the table to relieve the vertical reciprocating means of the entire weight of the table and the needles.

3. In a perforating machine of the character described, a resilient support adapted to receive fruit to be perforated, a horizontally disposed table mounted above said support, a plurality of perforating needles carried by said table, means for imparting reciprocal vertical movement to the table and the needles to and away from the resilient support to permit perforation of the fruit on the suppport, a frame interposed between the resilient support and the perforating needles, stripping wires carried by said frame between which the needles are adapted to pass, and means for resiliently supporting the frame and the stripping wires.

4. In a perforating machine of the character described, a main frame, a pair of pulleys journalled in said frame, one at each end thereof, an endless resilient belt carried by said pulleys, a drive shaft journalled in the frame and adapted to be continuously rotated, an intermediate shaft journalled in the frame, a driving connection between said intermediate shaft and one of the pulleys, a hub member secured on the intermediate shaft, a plurality of arms on said hub member, a plate secured on the drive shaft, and a pair of interspaced pins on said plate, said pins adapted to alternately engage the arms on the intermediate shaft and thereby impart an intermittent rotary movement to the intermediate shaft and the pulleys supporting the resilient belt.

5. In a perforating machine of the character described, a main frame, a pair of guide members secured, one on each side of the frame, a crosshead reciprocally mounted on each guide member, a horizontally disposed table secured between the crosshead members, a plurality of perforating needles secured to the lower face of said table, a resilient support adapted to receive fruit to be perforated supported by the main frame and disposed between the guide members and below the perforating needles, means for intermittently advancing said resilient support, an adjustable roller carried by each crosshead member, a pair of cams, one on each side of the main frame engageable with said rollers to impart a vertical upward movement to the crosshead members, the table, and the perforating needles and spring actuated means for imparting a downward movement to said members.

THOMAS C. MOORE.